Figure 1:
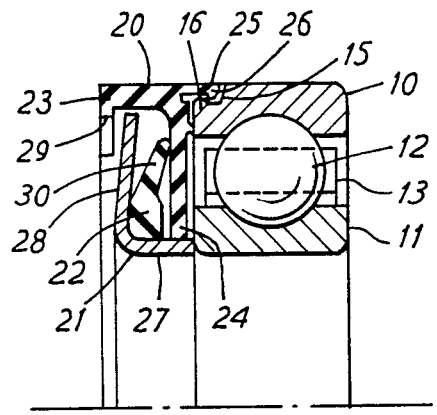

United States Patent [19]

Neal

[11] Patent Number: 4,555,188
[45] Date of Patent: Nov. 26, 1985

[54] BEARING AND SEAL ASSEMBLY
[75] Inventor: Hubert W. T. Neal, Luton, England
[73] Assignee: SKF (U.K.) Limited, Luton, England
[21] Appl. No.: 680,572
[22] Filed: Dec. 11, 1984
[30] Foreign Application Priority Data
Dec. 21, 1983 [GB] United Kingdom ............... 8333962
[51] Int. Cl.$^4$ ............................................. F16C 33/78
[52] U.S. Cl. ...................................... 384/482; 277/95; 384/903
[58] Field of Search ................ 384/482, 484, 140, 151, 384/153, 903; 308/DIG. 11; 277/95, 168

[56] References Cited
U.S. PATENT DOCUMENTS
3,556,539 1/1971 Senigalliesi ........................ 384/140
4,262,914 4/1981 Roley .................................... 277/95
4,364,615 12/1982 Euler .................................. 384/903
4,515,574 5/1985 Mazziotti ........................... 384/482

Primary Examiner—Lenard A. Footland
Attorney, Agent, or Firm—Browdy and Neimark

[57] ABSTRACT

A bearing and seal assembly in which the seal has an outer casing formed with claws which are engaged in an annular groove in the outer periphery of the outer bearing ring, and a resilient annular lip or washer compressed between the outer casing and the adjacent side wall of the bearing ring and urging the outer casing away from the bearing ring, so as to engage the claws as a tight fit against a side wall of the annular groove. In one embodiment, the outer casing of the seal is made of resilient material and the annular lip is formed integral with the casing. In another embodiment, a non-planar washer of resilient material is compressed between a step on the outer casing and the adjacent side wall of the outer bearing ring.

17 Claims, 12 Drawing Figures

BEARING AND SEAL ASSEMBLY

This invention relates to ball or roller bearings fitted with a seal attached to the outer or inner bearing ring.

It is known to attach a sealing ring to the outer bearing ring of a bearing by providing the sealing ring with a claw engaged in an annular groove in the outer periphery of the bearing ring. The claw may be formed integral with the sealing ring and engaged with a snap fit in the annular groove, or the claw may be formed in one end of a metal casing which surrounds the sealing ring and which is pressed radially inwards upon assembly to hold the sealing ring against the bearing ring and engage the claw in the annular groove. In large scale manufacture of bearings however, the manufacturing tolerances on the size of the annular groove do not enable a tight assembly to be assured merely by a claw attachment between the seal and a bearing ring.

According to the present invention there is provided a ball or roller bearing and seal assembly in which the bearing comprises an outer bearing ring, an inner bearing ring, and rolling elements disposed between the two bearing rings and in rolling engagement therewith, the periphery of one of the bearing rings being formed with a recess having a side wall thereof facing in the direction away from the seal, and the seal comprises a component having one or more claws engaged in the recess, wherein the assembly comprises resilient means which urge the seal component in a direction away from said one bearing ring so as to engage the claw or claws as a tight fit against the side wall of the recess. The said one bearing ring preferably has an annular groove which extend around the periphery of the bearing ring and forms the recess, and the seal component formed with an annular series of claws engaged in the groove.

The seal component can conveniently be formed of resilient material and provided with one or more projections which abut against a side wall of the bearing ring, the projection being deformed and constituting the resilient means which urge the seal component in the direction away from the bearing ring due to its resistance to deformation. The projection can conveniently comprise an annular lip which makes sealing contact with the side wall of the bearing ring.

The resilient means may however comprise another component of the seal which is compressed between the bearing ring and the seal component fitted with the claws. For example, the resilient means may comprise a seal washer adapted to make sealing contact with the sealing ring, the seal washer comprising an annular disc of resilient material having a rim portion which is inclined relative to a radial plane through the centre of the disc, and the rim portion being clamped between the bearing ring and the seal component fitted with the claws.

The present invention is particularly applicable to a seal assembly comprising an annular casing having an annular seal washer secured to or integral therewith, an annular support member which co-operates with the casing and seal washer to form an annular chamber, and a sealing ring of resilient material in the annular chamber, the sealing ring being mounted on the support member and having an annular flexible lip in sealing sliding contact with the seal washer, the annular casing being formed with the claws which are engaged with the annular groove in the bearing ring. A bearing and seal assembly of this construction is suitable for mounting in the annular recess between two components rotatable relative to one another by the bearing.

Figure 4:
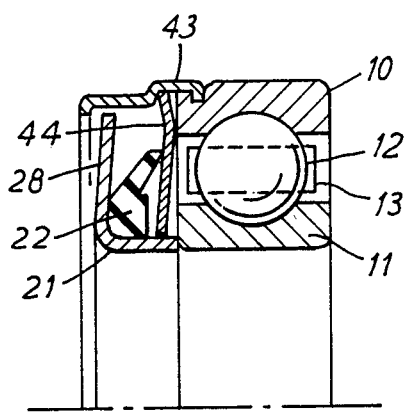
Figure 2:
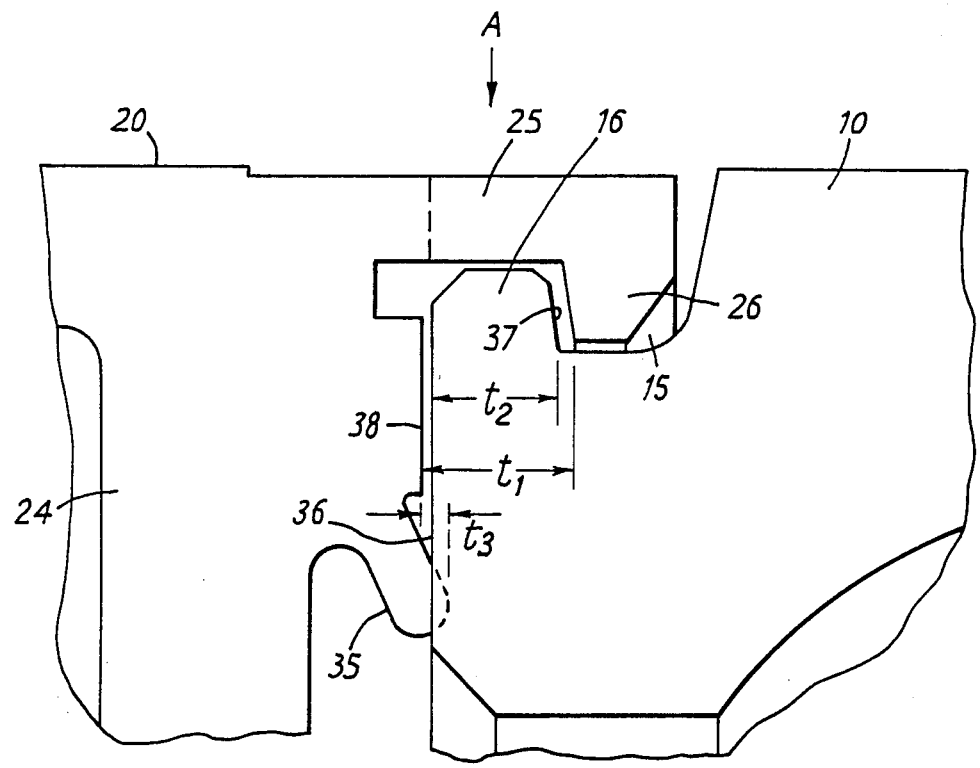
Figure 3:
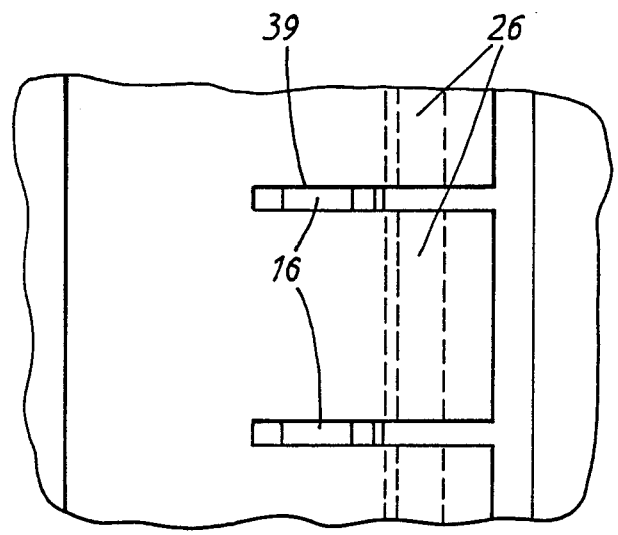
Figure 5:
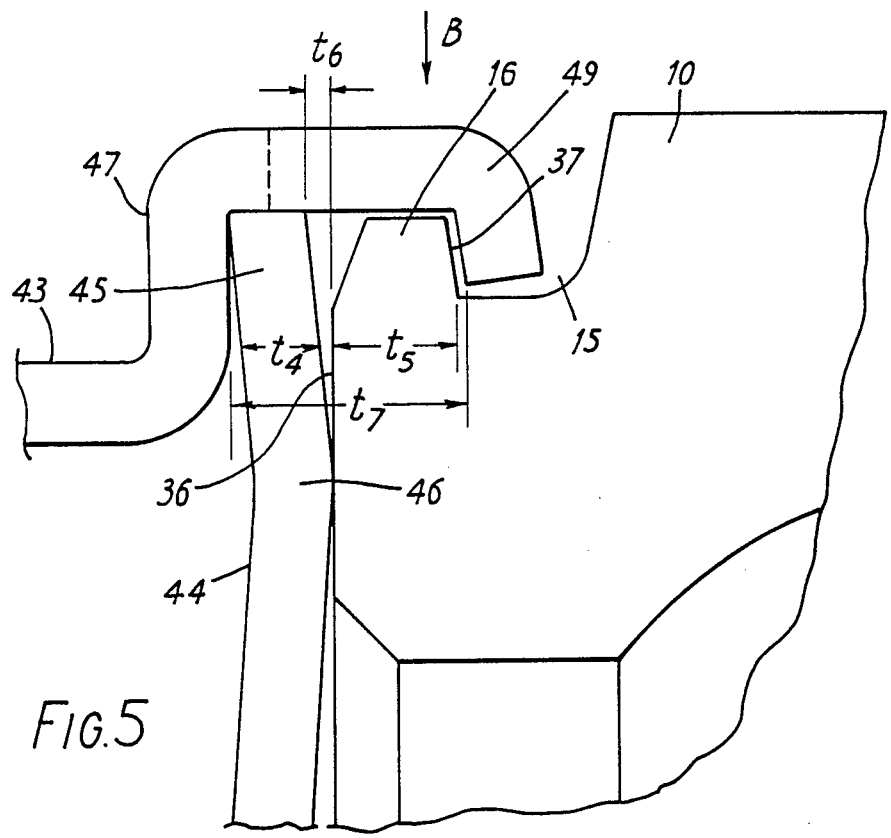
Figure 6:
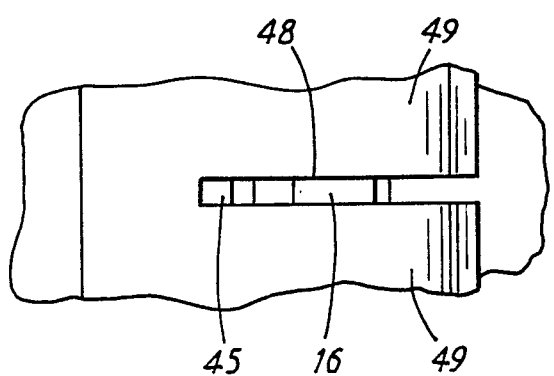
Figure 7:
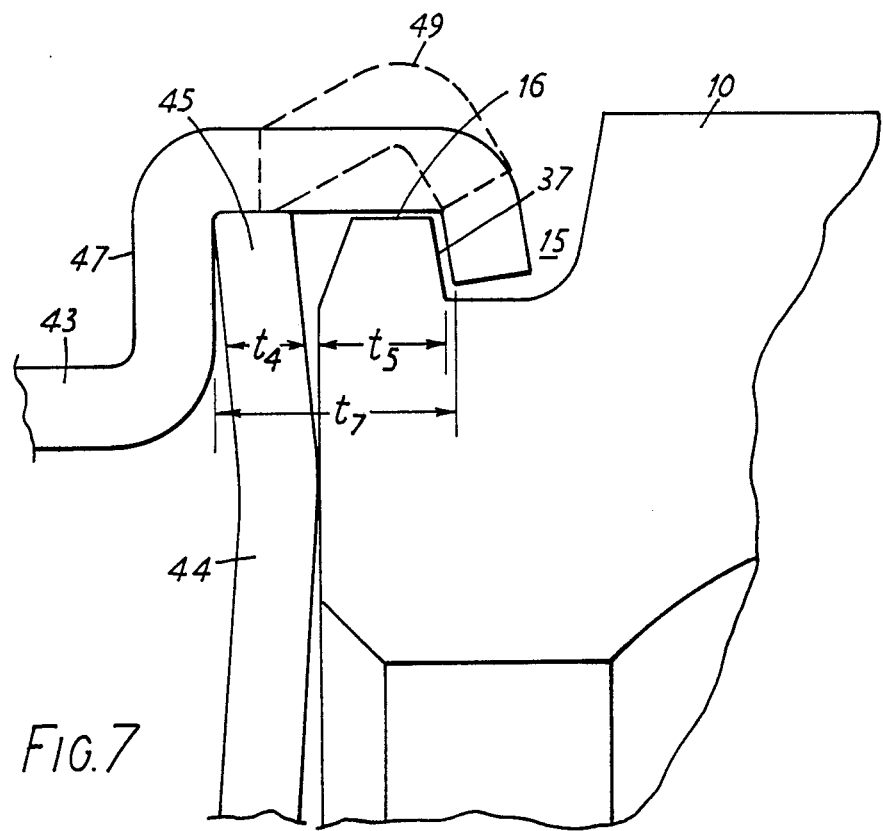
Figure 8:
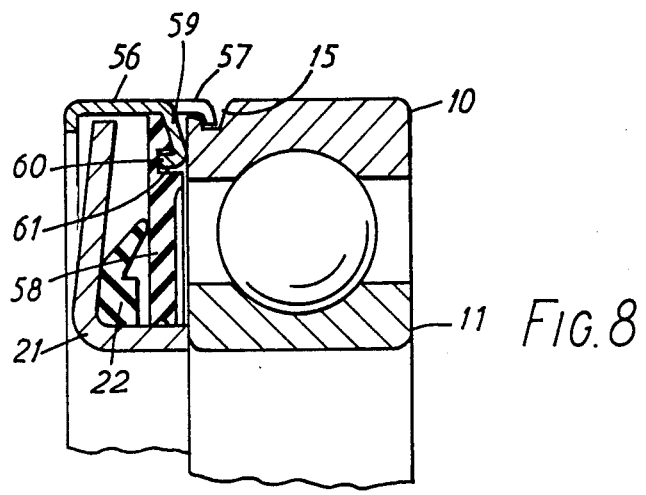
Figure 9:
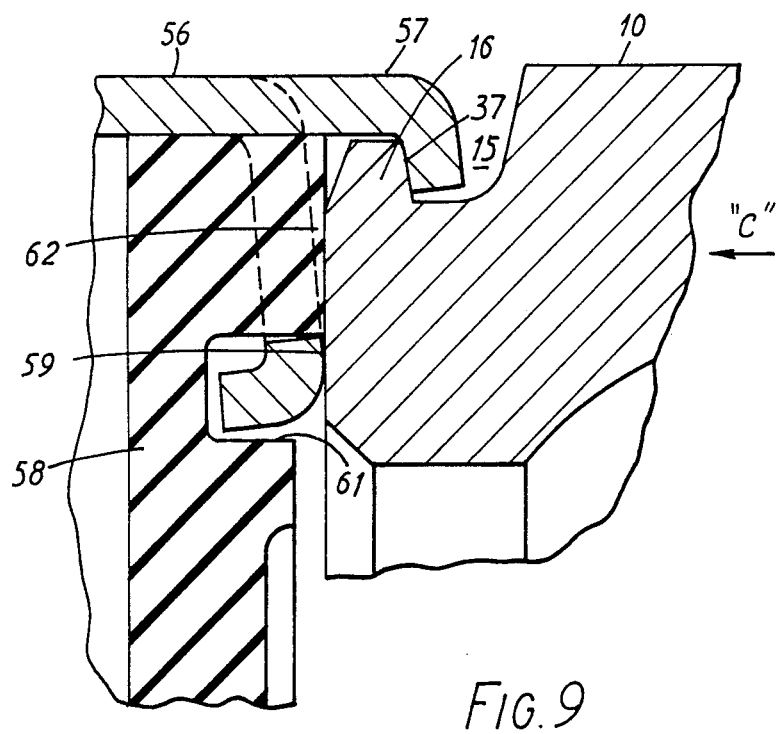
Figure 10:
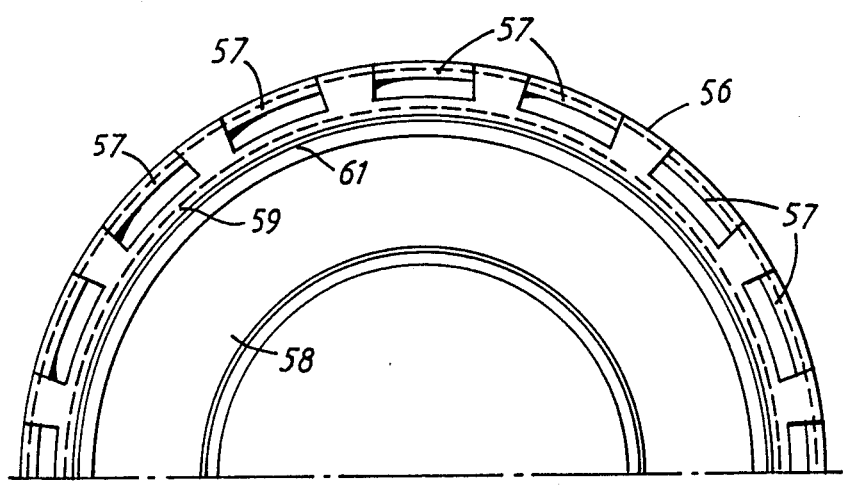
Figure 11:
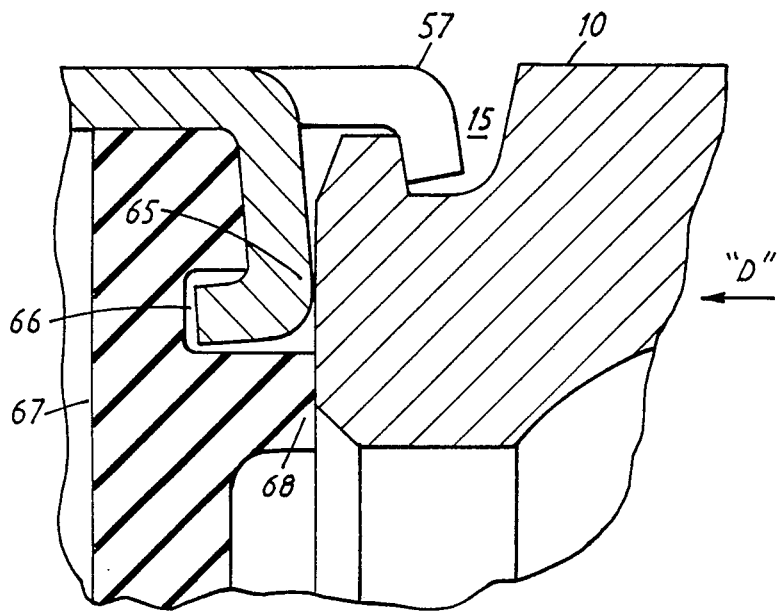
Figure 12:
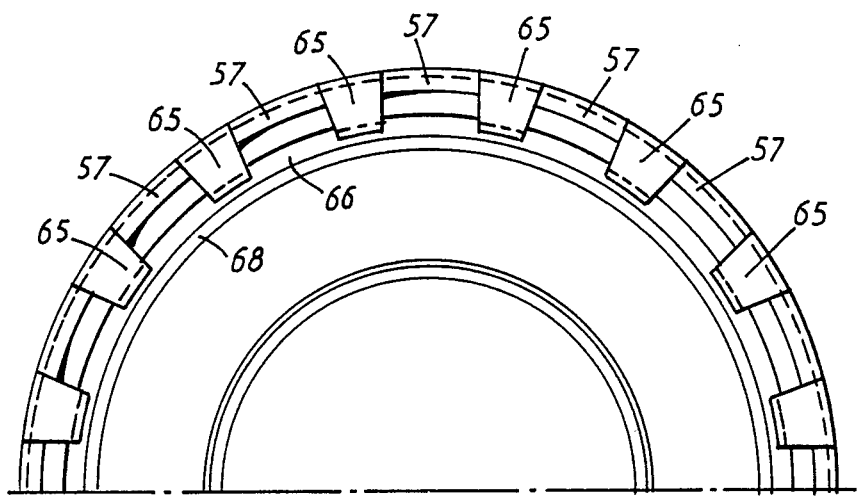

Embodiments of the invention will now be described, by way of example, with reference to the accompanying drawings, in which:

FIG. 1 is a cross section through a ball bearing fitted with a seal in accordance with the invention, FIG. 2 is a diagrammatic view of a cross section on a larger scale of part of the ball bearing and seal assembly of FIG. 1, showing the mounting of the outer casing of the seal on the outer bearing ring, FIG. 3 is a view taken in the direction of arrow A in FIG. 2, FIG. 4 is a cross section through a ball bearing fitted with another form of seal in accordance with the invention, FIG. 5 is a diagrammatic view of a cross section on a larger scale of part of the ball bearing and seal assembly of FIG. 4, showing the mounting of the outer casing and the seal washer on the outer bearing ring, FIG. 6 is a view taken in the direction of arrow B in FIG. 5, FIG. 7 is a view similar to that of FIG. 5 of a modification of the ball bearing and seal assembly of FIG. 5, FIG. 8 is a cross section through a ball bearing fitted with another form of seal in accordance with the invention, FIG. 9 is a cross section of part of the ball bearing and seal assembly of FIG. 8 but on a larger scale and showing the mounting of the outer casing and seal washer on the outer bearing ring, FIG. 10 is a view of a half section of the seal only of the assembly of FIG. 9, taken in the direction of arrow C in FIG. 9, FIG. 11 is a view similar to that of FIG. 9 of a modification of the ball bearing and seal assembly of FIG. 9, and FIG. 12 is a view of a half section of the seal only of the assembly of FIG. 11, taken in the direction of arrow D in FIG. 11.

In the drawings, like parts in the different embodiments are denoted by like reference numerals.

The ball bearing and seal assembly shown in FIGS. 1–3 comprises an outer bearing ring 10, an inner bearing ring 11, balls 12 in rolling engagement with tracks on the two bearing rings, and a cage 13 spacing the balls around the rings. The outer periphery of the outer bearing ring is formed with an annular groove 15 adjacent one side of the bearing ring, and the part of the bearing ring between the groove 15 and the adjacent side of the bearing ring is cut away to form an annular flange 16 of smaller diameter than the remainder of the periphery of the bearing ring.

The seal assembly comprises an annular outer casing 20 moulded in resilient plastics material, an annular inner casing 21 made of metal, and a seal ring 22 made of rubber or like resilient material. The outer casing 20 has a cylindrical wall 23 and an inwardly projecting radial wall 24 formed integral with the wall 23 adjacent the inner end thereof, that is the end adjacent the ball bearing. The wall 24 forms a seal washer. The inner end of the cylindrical wall 23 terminates in an axial flange 25 having an inwardly projecting lip, the flange 25 being sub-divided by axial slots to form flexible claws 26 which are engaged as a snap fit in the annular groove 15. The outer periphery of the axially outer portion of the cylindrical wall 23 is substantially flush with the outer periphery of the outer bearing ring 10, but the outer periphery of the axially inner portion of the wall 23 is stepped radially inwards as shown in FIG. 2 so that the axial flange 25 is inset radially inwards by a small distance relative to the outer bearing ring 10 in order to facilitate fitting of the assembly into an annular recess. The inner casing 21 is substantially of L shaped cross section and has a cylindrical wall 27 the end of which abuts the adjacent side wall of the inner bearing ring and an outwardly projecting radial wall 28 the outer end of which is spaced with small clearance from the inner surface of the wall 23 of the outer casing. The wall 28 of the inner casing is inclined axially inwards at a small angle towards the ball bearing, and the axially outer end of the wall 23 is formed with lips 29 (only one of which is shown in FIG. 1) which overlap the radially outer end of the wall 28 of the inner casing and thereby retain the inner casing within the outer casing. The seal ring 22 is seated within the inner casing at the junction between the walls 27, 28 and has an annular sealing lip 30 which is in sealing sliding contact with the seal washer formed by the wall 24 of the outer casing. The seal ring 22 could if desired be moulded onto the inner casing 21.

As shown in FIG. 2, the wall 24 of the outer casing is formed with an annular lip 35 on the side adjacent the outer bearing ring, the lip 35 abutting against and being deformed by the side wall 36 of the outer bearing ring when the claws 26 are engaged in the annular groove 15 on the bearing ring. The resistance against deformation of the lip 35 exerts on the outer casing 20 a force which urges the outer casing in a direction away from the outer bearing ring, and thereby engages the claws 26 with a tight fit against the axially outer side wall 37 of the groove 15. In this construction the outer casing 20 must of course be formed of resilient material, such as resilient plastics material, and the design of the bearing and seal assembly must be such that the distance $t_3$ which the lip 35 projects from the side face 38 of the wall 24 is greater than the difference between the distance $t_1$ of the hooks on the claws 26 from the side face 38 and the thickness $t_2$ of the flange 16. That is:

$$t_3 > t_1 - t_2$$

The seal is fitted to the ball bearing by forcing the outer casing 20 against the bearing so as to cause the claws 26 to ride up the flange 16 and engage with a snap fit in the annular groove 15, and also cause the annular lip 35 to be deformed by engagement with the side wall 36 of the bearing. FIG. 3 shows the slots 39 between the claws which permit the claws to move independently of one another during the fitting of the seal. The annular lip 35 provides a seal which prevents entry of foreign matter into the bearing through the space between the outer casing and the outer bearing ring.

The ball bearing and seal assembly of FIGS. 4-6 is similar to that of FIGS. 1-3 except that the outer casing 43 is made of metal and the seal washer 44 is a separate component. The other components of the bearing and seal assembly are the same as those of the assembly of FIGS. 1-3 and are denoted by the same reference numerals.

As shown more clearly in FIG. 5, the seal washer 44 comprises an annular disc in which the outer rim portion 45 is inclined axially outwards at a small angle in the radially outer direction, and the remainder of the annular disc is inclined axially outwards at a small angle in the radially inner direction, so that when the disc is held against the outer bearing ring it is the junction 46 between the rim portion and the remainder of the disc which contacts the side face of the bearing ring. The outer casing is pre-formed into a profile in which the axially inner portion has a step 47 which extends radially outwards around the outer rim 45 of the seal washer and across the flange 16 on the outer bearing ring, the inner end of the outer casing being turned radially inwards to engage in the annular groove 15 in the outer bearing ring. As shown in FIG. 6, the stepped end portion of the outer casing has axial slots 48 which divide the end portion of the outer casing into flexible claws 49. In the assembled bearing and seal, the rim portion 45 of the seal washer is clamped between the step 47 in the outer casing and the adjacent side face 36 of the outer bearing ring, with the claws 49 engaged against the axially outer side wall 37 of the groove 15 in the bearing ring. The design of the bearing and seal assembly is such that the distance $t_7$ of the hooks on the claws 49 from the step 47 is less than the aggregate of the thickness $t_4$ of the seal washer 44, the thickness $t_5$ of the flange 16 on the outer bearing ring, and the axial offset $t_6$ of the periphery of the seal washer relative to the junction 46 between the two inclined portions of the seal washer when the seal washer is in an unstressed condition. That is:

$$t_7 < t_4 + t_5 + t_6$$

These dimensions ensure that the seal washer 44 will be subjected to compressive deformation when the claws 49 are engaged with the groove 15 in the outer bearing ring, and the resistance to this deformation exerts on the outer casing a force which urges the outer casing in a direction away from the outer bearing ring, and thereby engages the claws 49 with a tight fit against the axially outer side wall 37 of the groove 15 in the bearing ring. The seal is fitted to the ball bearing by forcing the outer casing against the bearing so as to cause the claws 49 to ride up the flange 16 and engage with a snap fit in the annular groove 15. The seal washer makes sealing contact with the outer casing around its full periphery, and the seal washer also makes sealing contact with the inner bearing ring.

The bearing and seal assembly of FIG. 7 is similar to that of FIGS. 5 and 6, except that the outer casing of the seal is formed of a material which does not provide the claws 49 with sufficient flexibility to enable them to snap into the groove 15 after riding up the flange 16 upon fitting of the seal to the bearing. The outer casing is therefore shaped during manufacture so that the claws 49 project radially outwards as shown in broken lines in FIG. 7. The seal is fitted to the outer bearing ring by compressing the seal washer 44 between the step 47 on the outer casing and the outer bearing ring, and then pressing the claws 49 radially inwards to engage the claws in the groove 15.

The seals shown in FIGS. 2, 5 and 7 are all attached to an outer bearing ring by claws on the outer casing engaged in an annular groove in the outer periphery of the outer bearing ring, the outer casing being urged away from the bearing ring in accordance with the invention to maintain a tight fit of the claws in the groove. It is of course to be understood that the seals could instead be attached to an inner bearing ring by claws on an inner casing engaged in an annular groove in the inner periphery of the inner bearing ring, the inner casing being urged away from the bearing ring in accordance with the invention to maintain a tight fit of the claws in the groove. In such a construction, the inner casing would have the seal washer and the outer casing would be of L shaped construction and carry the seal ring 22.

The ball bearing and seal assembly shown in FIGS. 8-10 is similar to that of FIGS. 1-3 in that the axially inner end of the outer casing 56 is provided with an annular series of claws 57 engaged with the annular groove 15 on the outer bearing ring. In the assembly of FIGS. 8-10 however, the seal washer 58 is a separate component from the outer casing, and the axially inner end of the outer casing is also formed with an annular flange 59 which extends radially inwards and has a hook shaped end 60 engaged in an annular groove 61 in the side face of the seal washer adjacent the bearing ring. The claws 57 and the flange 59 are arranged so that, when the claws 57 are engaged in the groove 15, the bearing ring abuts against the flange 59 and deflects the flange axially outwards. The resistance of flange 59 to deflection exerts a force on the outer casing which urges the outer casing 56 in the direction away from the bearing and thereby engages the claws 57 with a tight fit against the axially outer side wall 37 of the groove 15. The outer casing 56 can conveniently be manufactured from a thin walled metal cylinder by first turning in an end of the cylinder to form the hook shaped end 60, pressing in a larger end portion of the cylinder to form the flange 59, stamping out fingers of metal from the flange 59, and then shaping the fingers to form the claws 57. The seal washer is cut away on the side adjacent the bearing ring to provide recesses for reception of the flange 59, and the parts of the seal washer between the cut-away portions form projecting abutments 62 which engage against the end face of the bearing ring. The free end of the flange 59 makes contact with the outer bearing ring around its full periphery and provides a seal between the outer casing 56 and the outer bearing ring.

The ball bearing and seal assembly of FIGS. 11 and 12 is similar to that of FIGS. 8-10, except that the annular flange 59 is replaced by separate claws 65 which engage in an annular groove 66 in the side of the seal washer 67. The part of the seal washer surrounding the groove 66 is cut away to provide recesses for the reception of the arms of the claws 65. The part of the seal washer surrounded by the groove 66 forms an annular lip 68 which abuts against the side wall of the bearing ring and provides a seal which prevents entry of foreign matter into the bearing ring through the space between the outer casing and the outer bearing ring.

I claim:

1. A ball or roller bearing and seal assembly in which the bearing comprises an outer bearing ring, an inner bearing ring, and rolling elements disposed between the two bearing rings and in rolling engagement therewith, the periphery of one of the bearing rings being formed with a recess having a side wall thereof facing in the direction away from the seal, and the seal comprises a component having one or more claws engaged in said recess, wherein the assembly comprises resilient means which urge the seal component in a direction away from said one bearing ring so as to engage the claw or claws as a tight fit against said side wall of the recess.

2. A bearing and seal assembly as claimed in claim 1, wherein said one bearing ring has an annular groove which extends around the periphery of the bearing ring and forms said recess, and said seal component is formed with an annular series of claws engaged in said groove.

3. A bearing and seal assembly as claimed in claim 2, wherein said seal component is formed of resilient material, and the claws are elastically deformable to permit the claws to slide over the edge of the periphery of the bearing ring and engage as a snap fit in the annular groove upon assembly of the bearing and seal.

4. A bearing and seal assembly as claimed in claim 2, wherein said seal component is formed of malleable material, and the claws are a press fit in the annular groove.

5. A bearing and seal assembly as claimed in claim 1, wherein said seal component is formed of resilient material and provided with one or more projections which abut against a side wall of said one bearing ring, the projection or projections being deformed and constituting the resilient means which urge the seal component in the direction away from the bearing ring due to its resistance to deformation.

6. A bearing and seal assembly as claimed in claim 5, wherein said projection comprises an annular lip which makes sealing contact with the side wall of the bearing ring.

7. A bearing and seal assembly as claimed in claim 6, wherein said seal component comprises an outer casing of the seal, said recess is formed in the outer periphery of the outer bearing ring, and said annular lip makes sealing contact with the adjacent side wall of the outer bearing ring and thereby prevents entry of foreign matter into the bearing through the space between the outer casing and the outer bearing ring.

8. A bearing and seal assembly as claimed in claim 7, wherein said outer casing is formed of resilient plastics material and comprises an outer cylindrical wall and an inner radial wall integral with the outer wall, and the seal includes a sealing ring in sealing contact with said radial wall.

9. A bearing and seal assembly as claimed in claim 5, wherein said seal component comprises an outer casing of the seal, the end of the outer casing adjacent the bearing is formed with an axial flange having an inwardly projecting lip, the axial flange having axial slots which subdivide the axial flange and lip to form said claws, and the outer periphery of the outer bearing ring has an annular groove forming said recess, said claws being engaged as a snap fit in said groove.

10. A bearing and seal assembly as claimed in claim 9, wherein the part of the outer bearing ring between the side thereof adjacent the seal and said annular groove is cut away to form an annular flange of smaller diameter than the remainder of the periphery of the bearing ring, and the axial flange on the outer casing has a thickness such that its outer periphery is inset radially inwards with respect to the outer periphery of the outer bearing ring.

11. A bearing and seal assembly as claimed in claim 1, wherein the resilient means comprises another component of the seal which is compressed between said one bearing ring and the seal component having the claws.

12. A bearing and seal assembly as claimed in claim 11, wherein the resilient means comprises a seal washer adapted to make sealing contact with a sealing ring, the seal washer comprising an annular disc of resilient material having a rim portion which is inclined relative to a radial plane through the centre of the disc, the rim portion being clamped between said one bearing ring and the seal component fitted with the claws.

13. A bearing and seal assembly as claimed in claim 12, wherein the outer periphery of the outer bearing ring has an annular groove forming said recess, the seal comprises an outer casing one end of which is formed with said claws, the claws being engaged in said groove, the wall of the outer casing adjacent the claws is formed with an annular step which extends radially outwards, and said rim portion of the seal washer is clamped between the annular step and the outer bearing ring.

14. A bearing and seal assembly as claimed in claim 13, wherein the seal washer makes sealing contact with the adjacent side wall of the outer bearing ring around the full periphery thereof.

15. A bearing and seal assembly as claimed in claim 1, wherein the outer periphery of the outer bearing ring has an annular groove forming said recess, the seal comprises an outer casing of resilient material formed with claws engaged as a snap fit in said groove, and the outer casing has one or more inwardly projecting flanges which abut against and are deflected by the adjacent side wall of the outer bearing ring, the inwardly projecting flanges forming said resilient means.

16. A bearing and seal assembly as claimed in claim 15, wherein the seal includes an annular seal washer mounted on the inside surface of said outer casing, the side of the seal washer adjacent the outer bearing ring is formed with an annular groove, said inwardly projecting flanges comprise claws engaged in the groove in the seal washer, and the part of the seal washer surrounded by the groove therein forms an annular lip which abuts against the side wall of the outer bearing ring and provides a seal which prevents entry of foreign matter into the bearing ring through the space between the outer casing and the outer bearing ring.

17. A bearing and seal assembly as claimed in claim 1, in which the seal comprises an annular casing having an annular seal washer secured to or integral therewith, an annular support member which co-operates with the casing and seal washer to form an annular chamber, and a sealing ring of resilient material in the annular chamber, the sealing ring being mounted on the support member and having an annular flexible lip in sealing sliding contact with the seal washer, wherein the outer periphery of the outer bearing ring has an annular groove forming said recess, the annular casing is formed with said claws, the claws being engaged with said annular groove and said resilient means are compressed between the outer casing and the adjacent side wall of the outer bearing ring.

* * * * *